United States Patent
Edwards

Patent Number: 5,923,304
Date of Patent: Jul. 13, 1999

[54] OMNIDIRECTIONAL ANTENNA SCHEME

[75] Inventor: Keith Russell Edwards, Paignton, United Kingdom

[73] Assignee: Nortel Networks Corporation, Montreal, Canada

[21] Appl. No.: 08/845,525

[22] Filed: Apr. 25, 1997

[30] Foreign Application Priority Data

Apr. 30, 1996 [GB] United Kingdom ............ 9608817

[51] Int. Cl.$^6$ .................................................. H01Q 21/00
[52] U.S. Cl. .......................................... 343/893; 343/795
[58] Field of Search ................................. 343/795, 893; 455/422, 509, 517, 524

[56] References Cited

U.S. PATENT DOCUMENTS

| | | | |
|---|---|---|---|
| 4,121,158 | 10/1978 | Hanni | 325/55 |
| 4,918,458 | 4/1990 | Brunner et al. | 343/795 |
| 5,264,862 | 11/1993 | Kumpfbeck | |
| 5,539,728 | 7/1996 | Gaiani et al. | 370/18 |
| 5,715,516 | 2/1998 | Howard et al. | 455/33.1 |

FOREIGN PATENT DOCUMENTS

| | | | |
|---|---|---|---|
| 0668668 A1 | 8/1995 | European Pat. Off. | |
| 0773637 A1 | 5/1997 | European Pat. Off. | |
| 2232 843 | 12/1990 | United Kingdom | G01S 3/02 |
| WO 95/02287 | 1/1995 | WIPO | H04B 7/04 |
| WO96/08908 | 3/1996 | WIPO | |

*Primary Examiner*—Frank G. Font
*Assistant Examiner*—Tu T. Nguyen
*Attorney, Agent, or Firm*—John D. Crane

[57] ABSTRACT

An antenna arrangement comprising at least 4 upright omnidirectional antenna is disclosed. The omnidirectional antennas are spaced apart in an irregular fashion. By providing at least 4 omnidirectional antenna in a irregular spaced apart arrangement, spatial diversity is provided, at any distant point from the antennas, by at least 3 antennas. Thus the minimum gain, for a four antenna arrangement, approaches 0.75 of the maximum gain when taking relative position of a receiver into account. A method of operating such an omnidirectional antenna scheme is also disclosed

4 Claims, 4 Drawing Sheets

OMNIDIRECTIONAL ANTENNA SCHEME

FIELD OF THE INVENTION

This invention relates to cellular radio communication systems and in particular relates to a base station arrangement comprising means to improve reception quality for an omnidirectional antenna arrangement.

BACKGROUND TO THE INVENTION

Cellular radio systems are currently in widespread use throughout the world providing telecommunications to mobile users. In order to meet the capacity demand, within the available frequency band allocation, cellular radio systems divide a geographic area to be covered into cells. At the centre of each cell is a base station through which the mobile stations communicate, typically being equipped with directional antenna arrays arranged in three or six sectored sub-cells where the higher gain of the narrow beamwidth antennas improve the uplink from the lower power mobiles. The distance between the cells is determined such that co-channel interference is maintained at a tolerable level.

Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions. A receiver moving through this spatially varying field experiences a fading rate which is proportional to its speed and the frequency of the transmission. Since the various components arrive from different directions, there is also a Doppler spread in the received spectrum. All these effects combine so that, in all practical systems, the antenna arrangements must be capable of overcoming at least some of these effects.

A prime consideration in all systems is the cost of the apparatus. A significant cost of any base station is determined by the type of antenna used. Omnidirectional antennas are not dedicated to a particular sector and transmit a 360° azimuthal beam. Such a beam is, typically, narrow in elevation. Omnidirectional antenna installations are therefore simple and cheap to install. An omnidirectional antenna, by its very nature, needs no beam steering and thus with this type of antenna there is no requirement for beam control electronics, further reducing costs. Other types of antennas, for instance, the flat plate antennas, especially of the adaptive variety, have beam steering electronics whereby a beam formed by an array of antenna elements is steered towards, for example, a mobile. Thus sectored antennas are more expensive, not only because the greater number of antennas employed, but also because they require more transceivers per site at initial deployment. For example, a simple omnidirectional site requires only one transceiver whereas a trisectored site will require three transceivers.

When a new cellular radio system is initially deployed, operators are often interested in maximising the range in order to minimise start up costs. Any increase in range means that fewer cells are required to cover a given geographic area, hence reducing the number of base stations and associated infrastructure costs.

The range of the link, either the uplink or the downlink, can be controlled principally in two different ways: by adjusting either the power of the transmitter or the sensitivity of the receiver. On the downlink the most obvious way of increasing the range is to increase the power of the base station transmitter. The output power of a transmitter, however, is constrained to quite a low level to meet national regulations. National regulations, which vary on a country to country basis, set a maximum limit on the effective isotropic radiation power (EIRP) which may be emitted. Accordingly other methods of improving the transmitted gain must be implemented.

One method of improving the receiver sensitivity and to reduce the effect of fading is to include some form of diversity gain. The object of a diverse system is to provide the receiver with more than one path, with the paths being differentiated from each other by some means, e.g. space, angle, frequency or polarisation. The use of these additional paths by the receiver provides the diversity gain. The amount of gain achieved depends upon the type of diversity, number of paths used, and the method of combining the various signals from the several signal paths.

There are several methods of improving the gain for omnidirectional antennas. One method requires the provision of two antennas spaced from each other by typically, 20 wavelengths (which is known as spatial diversity); a second method includes the provision of a linear array of radiating elements vertically stacked one above the other.

The use of two antennas in a spatially diverse system is typically used for repeater stations alongside highways and the like. The two antennas are placed along a line perpendicular to the highway. Omnidirectional antennas can also be grouped in a rectilinear spaced apart relationship, whereby spatial diversity from two antennas can be ensured mobiles. This may not, however, be sufficient to provide the required diversity. The vertical stacking of omnidirectional antennas on the other hand can improve the gain generally and can provide a stronger beam, which is pencil-like in elevation, but does not provide any diversity effects.

OBJECT OF THE INVENTION

The present invention seeks to provide an improved omnidirectional antenna scheme whereby the simple architecture of omnidirectional antennas can be utilised more effectively.

SUMMARY OF THE INVENTION

In accordance with the present invention there is provided an antenna arrangement comprising at least four upright omnidirectional omnidirectional antennas, wherein the omnidirectional antennas are arranged such that the axes of the antennas are spaced apart in an irregular fashion. Spatial diversity can thereby be utilised for reception of signals by mobile stations in the distance since at least three antennas will be seen by the mobile at any time. Such spatial diversity is not necessarily provided for reception of signals by receivers in close proximity to the base station, since the signal strength is unlikely to be reduced to an extent where spatial diversity is necessary. This irregularly spaced apart arrangement of antennas can also be considered as an arrangement wherein the axes of the antenna are spaced apart in a non-rectilinear spaced apart fashion.

In accordance with another aspect of the invention, there is provided an antenna arrangement comprising at least four upright omnidirectional antennas, wherein the omnidirectional antennas are arranged such that the axes of the or each group of four antennas are spaced apart in a V formation, with the axes of a first set of two antennas arranged so that they pass through a first leg of a V and the axes of the other set of two antennas arranged so that they pass through the second leg of the V; whereby, for each group of four antennas, only two positions exist in each plane passing through the group of antennas where only two antennas can be seen in direct line of sight.

Thus the minimum gain as seen by a mobile receiver in the distance, for a four antenna base station arrangement, is ≧0.75 of the maximum gain when taking relative position of a mobile within the cellular space into account. The use of four elements provides an optimal arrangement taking cost, complexity and space requirements into account. Five or more antennas could be used, but the percentage efficiency gains with respect to cost reduce considerably the greater the number of antennas.

In accordance with another aspect of the invention, there is provided a method of operating an omnidirectional antenna scheme comprising four vertically arranged omnidirectional antennas wherein the omnidirectional antenna are arranged such that the axes of the antenna are spaced apart in an irregular fashion, the method comprising the steps of feeding each antenna with a signal to be transmitted whereby a distant receive station may receive the signals with a receive gain determined by spatial diversity from at least three of the antennas, and reduced line of sight visibility with respect to the antennas occurs at co-ordinates in close proximity to the antenna arrangement.

In accordance with a still further aspect of the invention, there is provided a method of operating an omnidirectional antenna arrangement comprising at least four vertically oriented omnidirectional antennas, wherein the omnidirectional antennas are arranged such that the axes of the or each group of four antennas are spaced apart in a V formation, with the axes of a first set of two antennas arranged so that they pass through a first leg of a V and the axes of the other set of two antennas arranged so that they pass through the second leg of the V; the method comprising the steps of feeding each antenna with a signal to be transmitted; whereby a distant receive station may receive the signals with a receive gain determined by spatial diversity from at least three of the or each group of four antennas; and whereby, for each group of four antennas, only two positions exist in close proximity to the antenna arrangement where only two antennas can be seen in direct line of sight.

BRIEF DESCRIPTION OF THE DRAWINGS

In order to enable a full understanding of the invention, reference will now be made to the figures as shown in the accompanying drawing sheets, wherein.

DETAILED DESCRIPTION OF PREFERRED EMBODIMENTS

Figure 1:
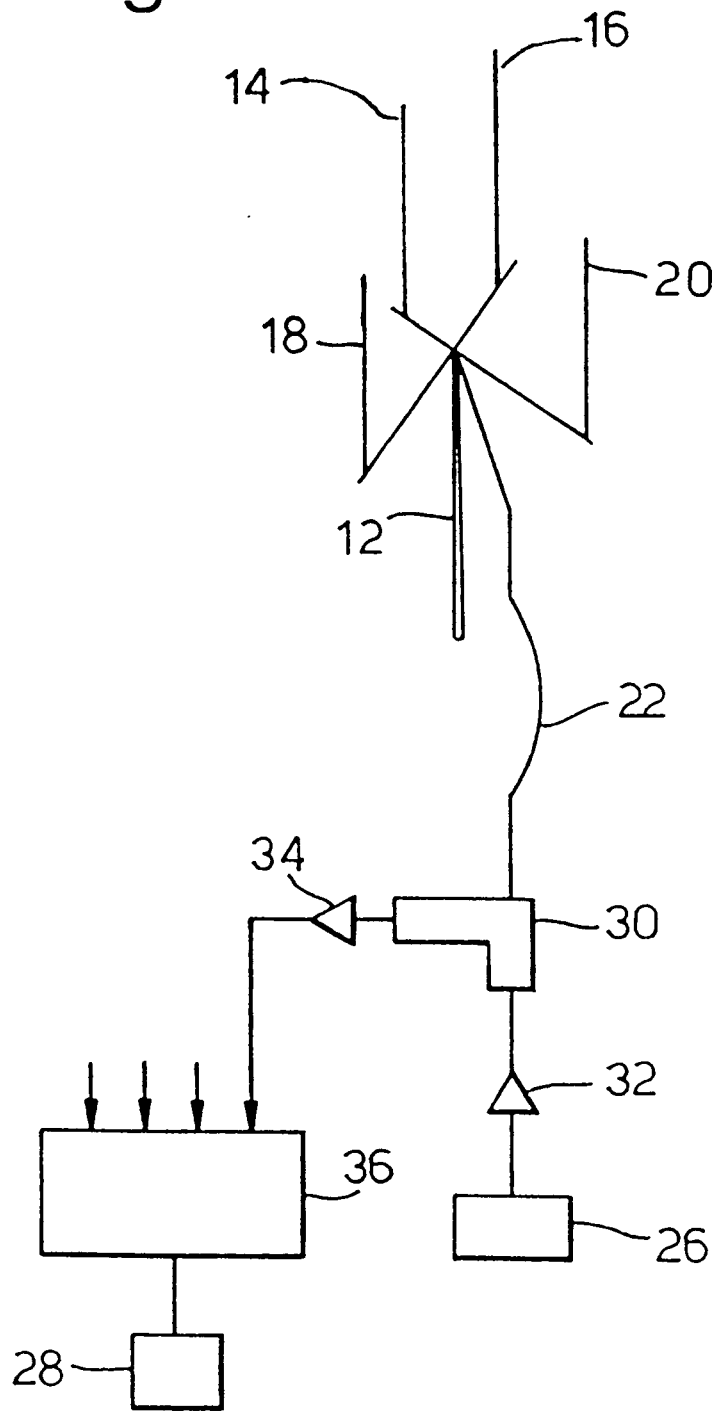
FIG. 1 shows a space station arrangement including four omnidirectional antennas in accordance with the invention.

Referring now to FIG. 1 there is shown an antenna structure 10 comprising a support structure 12 and four vertically oriented antenna elements 14, 16, 18, 20 and arranged in a non-rectilinear spaced apart relation to each other. Transmission lines 22 feed signals from base station controller 24. The base station controller comprises a transmitter 26 and receiver 28 which communicate with the transmission lines via diplexer 30, the transmitter preferably includes a power amplifier 32 which can be situated prior to signals being fed into the diplexer. Incoming signals from the antennas are directed by the transmission line 22 through the diplexer 30 through an amplifier 34 towards a diversity combiner and beam former 36. The purpose of a diversity combiner is to ensure that the signals received from each of the antenna elements 14,16,18,20 are combined in phase, with only the best signals being combined or otherwise, depending upon the type of combiner, from where they are eventually sent to the receiver.

Figure 2:
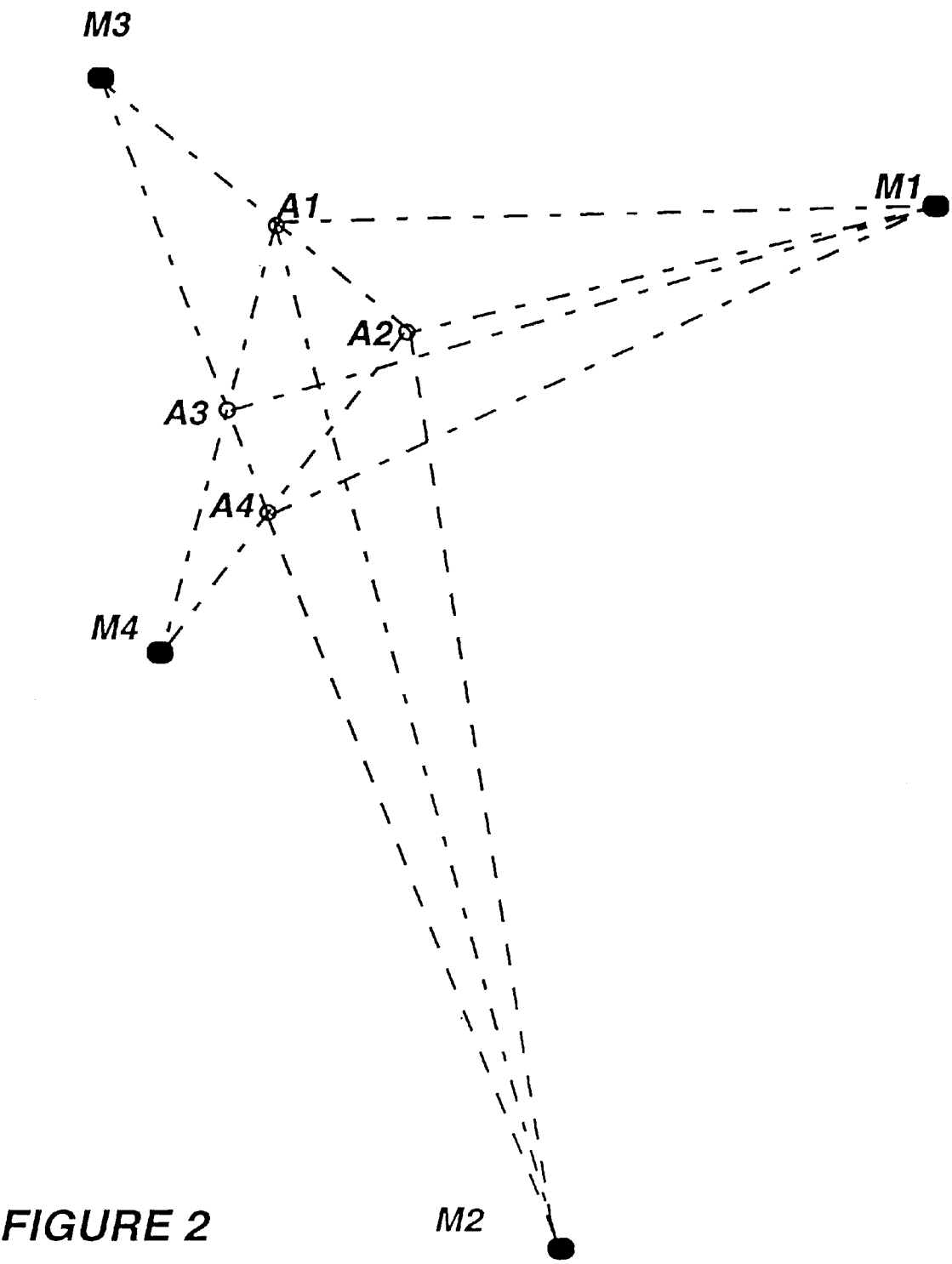
FIG. 2 shows the two minimum gain positions for a four antenna arrangement made in accordance with the invention.

FIG. 2 shows a typical scenario of a first embodiment of the present invention, with a base station antenna arrangement being provided with four antennas, A1 . . . A4. In this arrangement, at least 3 antennas are in line of sight communication with distant mobile stations. Distant mobile M1 is in direct line of sight communication with all four antenna elements. Distant mobiles M2 is in direct line of sight communication with 3 of the antennas, and thus the arrangement is operating at 75% efficiency (ignoring fading losses etc.). It is to be noted that an antenna not in line of sight view of the mobile may in fact receive reflected signals which, depending upon type of combiner, can be used constructively to add to the signal quality. Mobiles M3 and M4 are in the only two positions where the mobile can be in line of sight view with respect to two antenna elements since the antennas A2 and A4 are hidden by A1 and A3 respectively in the case of mobile M1; and antennas A1 and A2 are hidden by antennas A3 and A4 respectively in the case of mobile M4.

Figure 3:
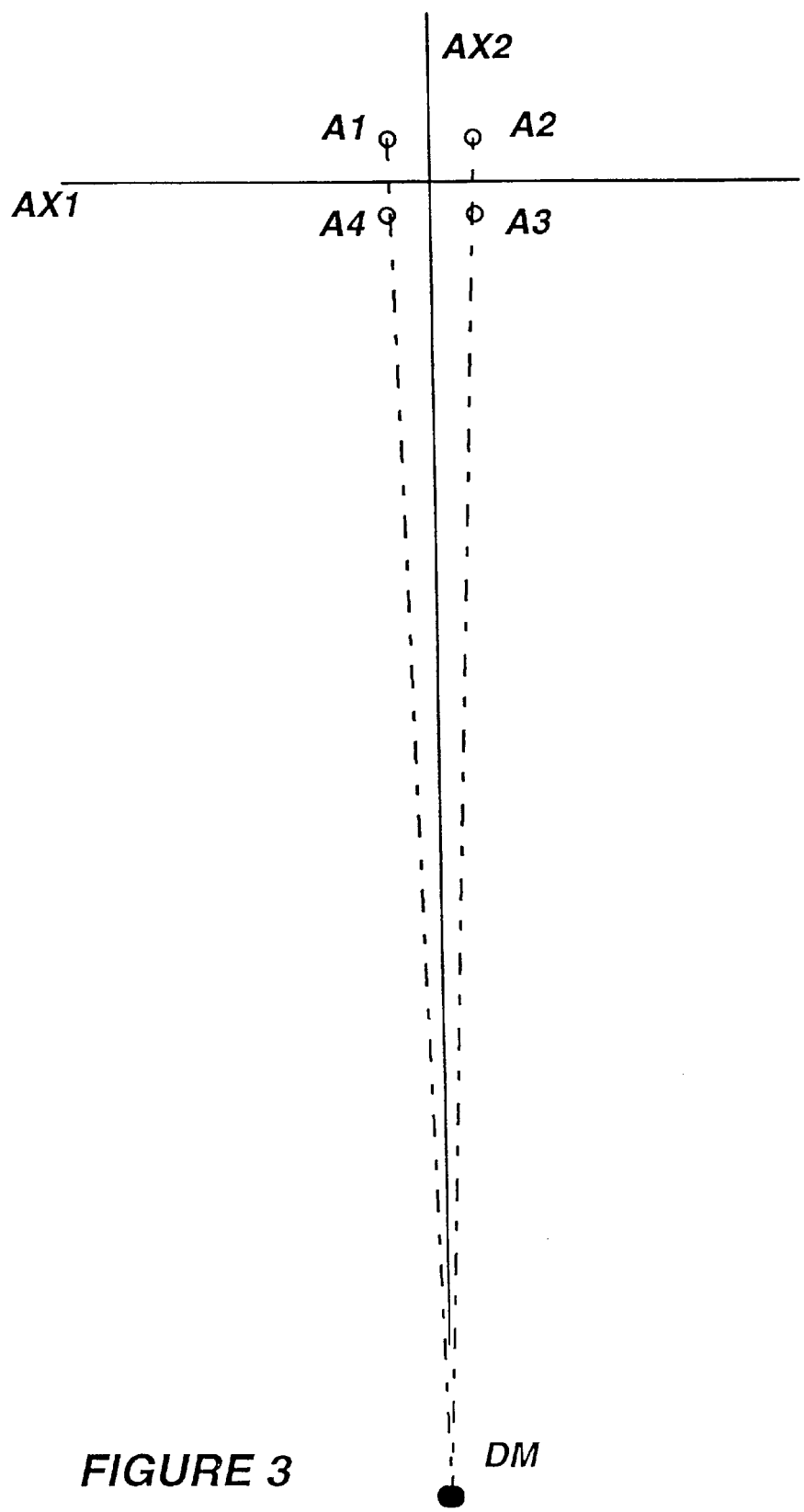
FIG. 3 shows the linear range of reduced gain for a conventional arrangement of four antennas.

For comparative purposes, a conventional arrangement of four rectilinearly arranged antennas are shown in FIG. 3. Along axes AX1 and AX2 there are continuous, linear positions where, in the distance, only two of the four antennas can be seen in a line of sight fashion, as exemplified by distant mobile DM. As a consequence, gain can be reduced for receiver-transmitter situations where it is most needed. In the near field, where additional gain is not normally necessary, line of sight view of at least three antennas is always possible.

The same principle of arranging four antennas can be applied to five, six or more antennas, but the corresponding improvements in line of sight view are reduced with respect to a normal rectilinear/regular arrangement for a similar number of antennas.

Figure 4:
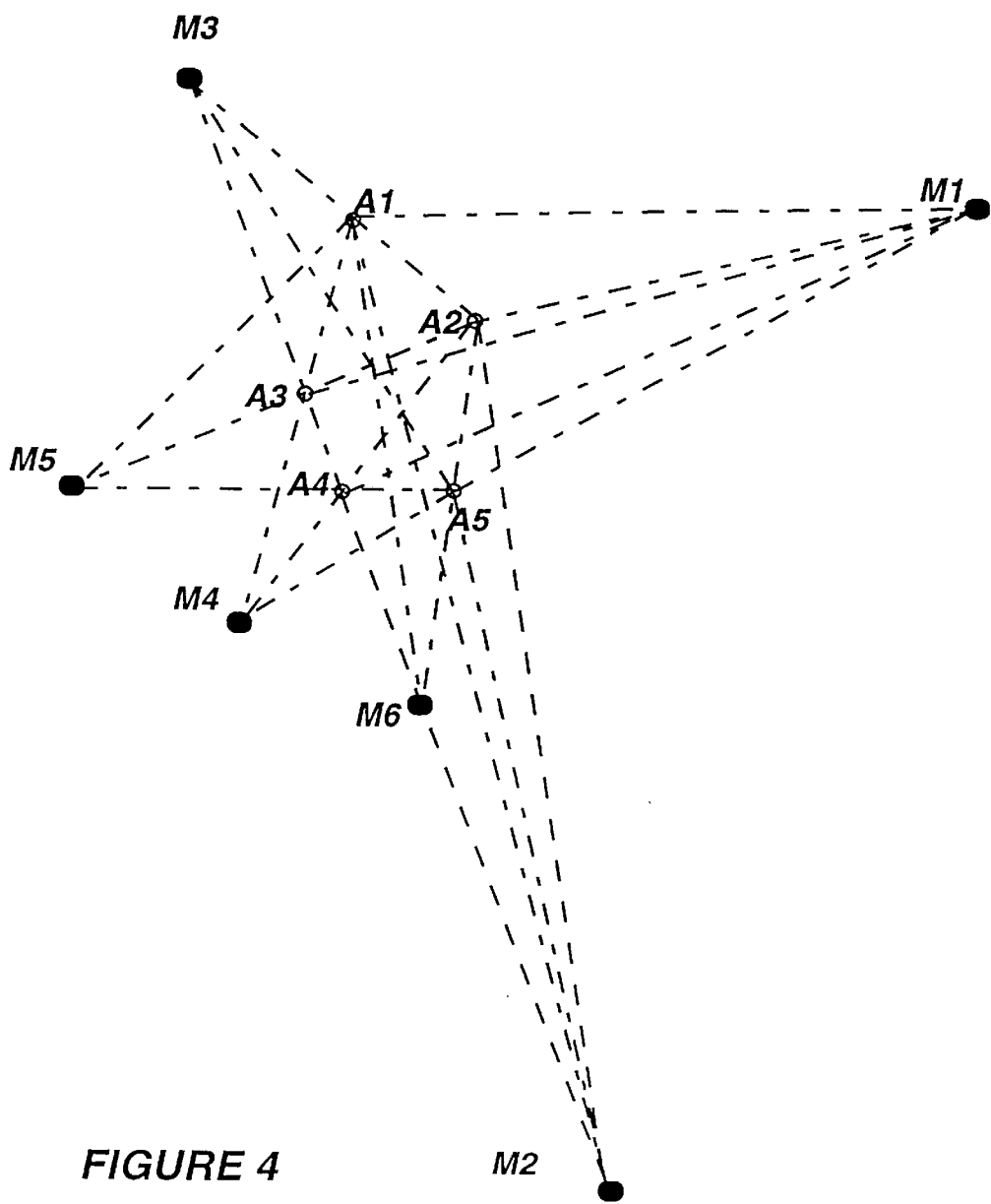
FIG. 4 shows four minimum gain positions for a five antenna arrangement made in accordance with the invention.

FIG. 4 shows an arrangement in accordance with the present invention having five antennas, A1 . . . A5. In this arrangement, for each sub-group of four antennas, at least 3 antennas are in line of sight communication with distant mobile stations. Distant mobile M1 is in direct line of sight communication with all five antenna elements. Mobile M2 is in direct line of sight communication with four of the antennas, and thus the arrangement is operating at 80% efficiency (ignoring fading losses etc.). Mobiles M3, M4, M5 and M6 are in the only positions where the mobile can be in line of sight view with respect to three antenna elements for two of the five possible groups of four antennas and thus the arrangement is operating at 60% efficiency (ignoring fading losses etc.). In these cases, antennas A2 and A4 are hidden by A1 and A3 respectively in the case of mobile M3; and antennas A1 and A2 are hidden by antennas A3 and A4 respectively in the case of mobile M4. Similarly, antennas A2 and A5 are hidden by antennas A3 and A4 respectively for mobile MS whilst antennas A3 and A2 are hidden by antennas A4 and A5 respectively for mobile M6. For reasons of simplicity, the corresponding reduced line of sight fixes for the other three groups of four antennas are not shown.

For a five antenna group, the number of points in the area in close proximity with the antenna arrangement where a reduced number of line of sight antenna fixes can be controlled whereby there are ten reduced visibility points. Bearing in mind that the present invention is particularly suitable for low cost and simple arrangements requiring a minimum of complexity, it is believed that for such arrangements, four antennas can provide an optimally convenient level of simplicity.

The availability of digital signal processing (DSP) has made possible the practical use of high performance diversity schemes such as maximum ratio combination and the switched co-phasal combiner (GB 9421538.1) With the advent of advanced cellular standards such as GSM, it is no longer necessary to site large numbers of transceivers per base station site. For example one GSM transceiver provides 8 full rate voice channels. GSM is also considerably more robust against the effects of interference than earlier analogue standards and so the use of omnidirectional, high capacity base sites can be considered and thus overcome the trunking inefficiency inherent in sectored arrangements. With the use of an omnidirectional base station in accordance with the invention, reuse patterns as tight as five can be viably employed. Using spatial combination on transmit with diplexers, high electronic isotropic radiation powers can be achieved by avoiding the losses usually incurred in either hybrid or cavity combiners. In order to balance a high power downlink, a four branch diversity scheme can be employed. In the case where the signal format provides some form of identification for the wanted signal (for example, the GSM training sequence), robust beam forming and/or null steering techniques can be employed even in high interference scenarios.

I claim:

1. A cellular radio communications base station antenna arrangement comprising at least four upright omnidirectional antennas each omnidirectional antenna being connected via transmission lines to a transmitter and receiver, wherein the omnidirectional antenna are arranged such that the axes of the antenna are spaced apart in a irregular fashion.

2. A cellular radio communications base station antenna arrangement comprising at least four vertically oriented omnidirectional antennas;

wherein the omnidirectional antennas each omni-directional antenna being connected via transmission lines to a transmitter and receiver are arranged such that the axes of a or each group of four antennas are spaced apart in a V formation, with the axes of a first set of two antennas arranged so that they pass through a first leg of the V formation and the axes of the other set of two antennas arranged so that they pass through the second leg of the V formation; and whereby, for each group of four antennas, only two positions exist in each plane passing through the group of antennas where only two antennas are disposed in direct line of sight.

3. A method of operating an omnidirectional antenna scheme for a cellular radio communications base station comprising four vertically arranged omnidirectional antennas each omnidirectional antenna being connected via transmission lines to a transmitter and receiver wherein the omnidirectional antenna are arranged such that the axes of the antenna are spaced apart in an irregular fashion;

the method comprising the steps of feeding each antenna with a signal to be transmitted whereby a distant receive station may receive the signals with a receive gain determined by spatial diversity from at least three of the antenna, and reduced line of sight visibility with respect to the antennas occurs at co-ordinates in close proximity to the antenna arrangement.

4. A method of operating an omnidirectional antenna arrangement for a cellular radio communications base station comprising at least four vertically oriented omnidirectional antennas each omni-directional antenna being connected via transmission lines to a transmitter and receiver, wherein the omnidirectional antennas arranged such that the axes of a or each group of four antennas are spaced apart in a V formation, with the axes of a first set of two antennas are arranged so that they pass though a first leg of the V formation and the axes of the other set of two antennas arranged so that they pass through the second leg of the V formation;

the method of comprising the steps of feeding each antenna with a signal to be transmitted; whereby a distant receive station my receive the signal with a receive gain determined by spatial diversity from at least three of the or each group of four antennas; and whereby, for each group of four antennas, only two positions exist in close proximity to the antenna arrangement where only two antennas are disposed in direct line of sight.

* * * * *